US009110633B2

(12) United States Patent
Yuan

(10) Patent No.: US 9,110,633 B2
(45) Date of Patent: Aug. 18, 2015

(54) ELECTRONIC APPARATUS AND BASE STRUCTURE THEREOF

(71) Applicant: Wistron Corporation, New Taipei (TW)

(72) Inventor: Peter Yuan, New Taipei (TW)

(73) Assignee: Wistron Corporation, New Taipei (TW)

( * ) Notice: Subject to any disclaimer, the term of this patent is extended or adjusted under 35 U.S.C. 154(b) by 147 days.

(21) Appl. No.: 14/052,031

(22) Filed: Oct. 11, 2013

(65) Prior Publication Data

US 2014/0211381 A1    Jul. 31, 2014

(30) Foreign Application Priority Data

Jan. 25, 2013   (CN) .......................... 2013 1 0030488

(51) Int. Cl.
    *G06F 1/16*    (2006.01)

(52) U.S. Cl.
    CPC ............ *G06F 1/1656* (2013.01); *G06F 1/1635* (2013.01)

(58) Field of Classification Search
    CPC combination set(s) only.
    See application file for complete search history.

(56) References Cited

U.S. PATENT DOCUMENTS

| 5,122,927 | A  | * | 6/1992  | Satou ........................ 361/679.09 |
| 5,124,887 | A  | * | 6/1992  | Kobayashi ............... 361/679.39 |
| 5,130,892 | A  | * | 7/1992  | Satou ........................ 361/679.55 |
| 5,182,699 | A  | * | 1/1993  | Kobayashi et al. ...... 361/679.41 |
| 5,200,883 | A  | * | 4/1993  | Kobayashi ............... 361/679.09 |
| 5,224,018 | A  | * | 6/1993  | Kobayashi ............... 361/679.37 |
| 5,225,293 | A  |   | 7/1993  | Mitchell et al. |
| 5,251,105 | A  | * | 10/1993 | Kobayashi et al. ...... 361/679.58 |
| 5,677,827 | A  | * | 10/1997 | Yoshioka et al. ........ 361/679.58 |
| 6,421,233 | B1 | * | 7/2002  | Hong ........................ 361/679.55 |
| 8,349,480 | B1 | * | 1/2013  | Chiang et al. ................. 429/100 |
| 2004/0066632 | A1 | * | 4/2004  | Fang ............................. 361/727 |
| 2004/0233630 | A1 | * | 11/2004 | Imamura ....................... 361/686 |
| 2006/0109619 | A1 | * | 5/2006  | Ito et al. ........................ 361/683 |
| 2007/0097614 | A1 | * | 5/2007  | Hsiao et al. ................... 361/683 |
| 2007/0197079 | A1 | * | 8/2007  | Lam et al. ..................... 439/345 |
| 2007/0281510 | A1 | * | 12/2007 | Lin et al. ......................... 439/74 |
| 2008/0043419 | A1 | * | 2/2008  | Tatsukami .................... 361/683 |
| 2008/0055840 | A1 | * | 3/2008  | Tanaka et al. ................. 361/683 |
| 2008/0101000 | A1 | * | 5/2008  | Asawa et al. ................. 361/681 |
| 2009/0040706 | A1 | * | 2/2009  | Kobayashi et al. .......... 361/681 |
| 2009/0140618 | A1 | * | 6/2009  | Kodaira ..................... 312/223.6 |
| 2009/0169980 | A1 | * | 7/2009  | Goto .............................. 429/96 |
| 2009/0169982 | A1 | * | 7/2009  | Goto ............................ 429/100 |
| 2010/0091454 | A1 | * | 4/2010  | Degner et al. ............ 361/679.58 |
| 2010/0136398 | A1 | * | 6/2010  | Chen et al. .................... 429/100 |

(Continued)

*Primary Examiner* — Lisa Lea Edmonds
(74) *Attorney, Agent, or Firm* — Muncy, Geissler, Olds & Lowe, P.C.

(57) ABSTRACT

A base structure includes a main body, a cover, a rod and an operating element. The main body includes a hollow portion, a containing portion for placing a battery module and an electrical connecting portion. The cover is combined detachably with the main body to cover the hollow portion. The operating element passes through the main body to connect to the rod, and drives the rod to move relative to the main body. After the cover is combined with the main body, the rod in a first position locks the cover. When the rod is moved from the first position to a second position, the rod unlocks the cover and pushes the cover outwards from the main body, and the rod pushes the battery module to be electrically disconnected from the electrical connecting portion at the same time.

20 Claims, 12 Drawing Sheets

(56) References Cited

U.S. PATENT DOCUMENTS

| | | |
|---|---|---|
| 2010/0330400 A1* | 12/2010 | Hu et al. .......................... 429/50 |
| 2012/0015530 A1* | 1/2012 | Tatsukami ....................... 439/64 |
| 2012/0039031 A1* | 2/2012 | Miyagi et al. ............ 361/679.01 |
| 2012/0052355 A1* | 3/2012 | Chiang et al. ................... 429/96 |
| 2012/0060363 A1* | 3/2012 | Wu et al. ......................... 29/763 |
| 2012/0307425 A1* | 12/2012 | Lo ............................ 361/679.01 |
| 2013/0093197 A1* | 4/2013 | Lee ............................... 292/145 |
| 2014/0091693 A1* | 4/2014 | Tatsukami et al. ......... 312/319.1 |

* cited by examiner

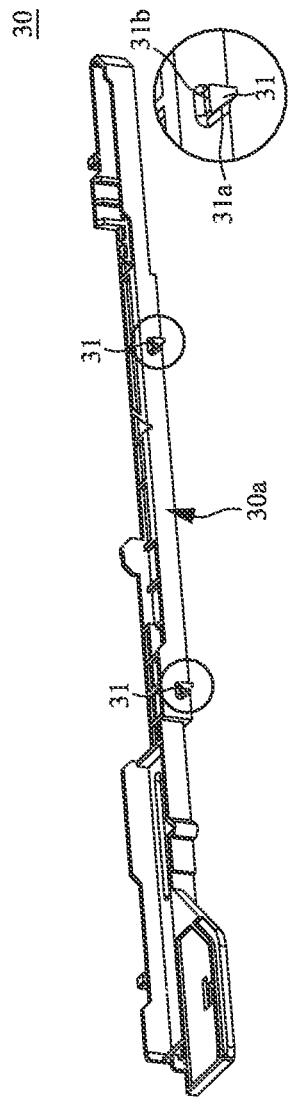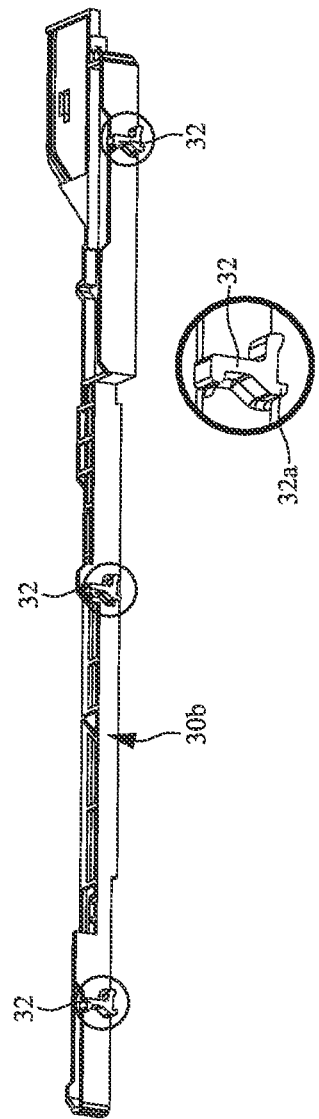

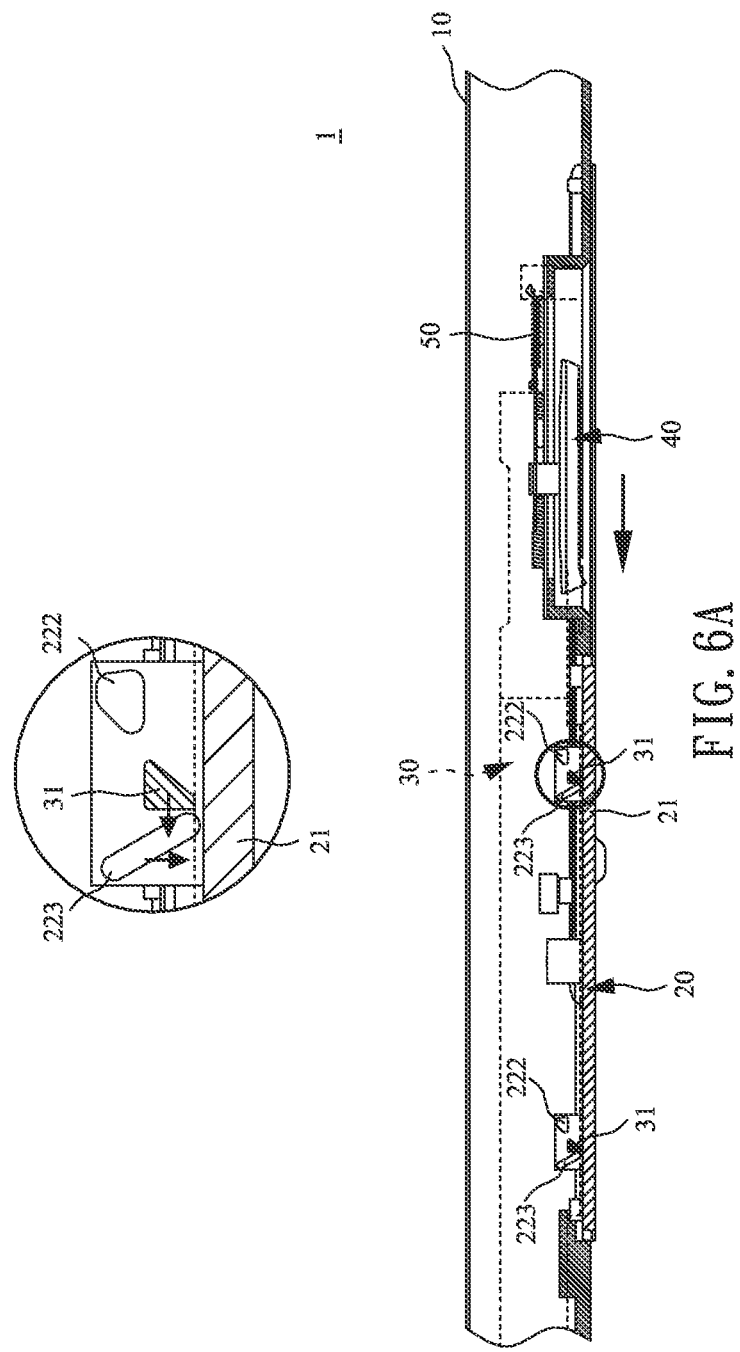

ELECTRONIC APPARATUS AND BASE STRUCTURE THEREOF

BACKGROUND OF THE INVENTION

1. Field of the Invention

The present invention relates to a base structure of an electronic apparatus, and more particularly, it relates to a base structure of an electronic apparatus that improves the convenience and security of replacing electrical parts within the base structure.

2. Description of the Related Art

In the general design of portable electronic devices such as laptop or tablet computers, the base has a flip cover or a recess for accommodating or replacing storage devices, the battery module, or other components. Traditional portable electronic devices mostly use screws to lock all kinds of flip covers on the bases. When a user wants to remove or replace any component in the base, he or she needs to use tools to repeatedly loosen or tighten those screws; it is very inconvenient for the user. Therefore, some portable electronic devices exclude the use of the screws. Instead, a fixing structure disposed on the flip cover is used to fix the flip cover to the base and a corresponding hole is disposed on the base near the flip cover. When it is necessary to disassemble such portable electronic devices, the user can directly extend a finger into the hole to open the flip cover. However, the added hole is of a certain size, and the beauty and overall consistency of the appearance of the device can be degraded.

Furthermore, when the components of the portable electronic device are disassembled and replaced, it is usually necessary to remove the battery module of the device first. If the user ignores this step, static electricity may damage the original functions of other components in the process of the replacement of components by hand. Severe damage could leave the device in a nonfunctioning state.

Therefore, it is necessary to further improve the base structure of an electronic apparatus to allow the easy removal of components and prevent the possibility of damage from static electricity to address the problems of the previous art.

SUMMARY OF THE INVENTION

A major objective of the present invention is to provide a base structure of an electronic apparatus that allows the easy removal of components and prevents damage from static electricity.

To achieve the aforementioned objective, a base structure of an electronic apparatus of the present invention comprises a main body, a cover, a rod and an operating element. The main body comprises a hollow portion, a containing portion for placing a battery module and an electrical connecting portion for electrically connecting to the battery module. The cover is combined detachably with the main body to cover the hollow portion, and the cover comprises at least one actuating element. The rod is combined moveably with the main body, and two sides of the rod are respectively adjacent to the hollow portion and the containing portion. The rod comprises at least one first driving portion and at least one second driving portion. The at least one first driving portion corresponds to the hollow portion, and the at least one second driving portion corresponds to the containing portion. The operating element passes through the main body and connects to the rod, and the operating element drives the rod to a first position or a second position relative to the main body.

After the cover is combined with the main body, the rod in the first position fixes the cover by the at least one first driving portion and the at least one actuating element of the cover forming a lock state. When the rod is moved from the first position to the second position, the at least one first driving portion unlocks the lock state with the at least one actuating element and pushes the at least one actuating element to move the cover outwards from the main body; at the same time, the at least one second driving portion pushes the battery module such that the battery module is electrically disconnected from the electrical connecting portion.

Accordingly, when the user needs to detach or exchange a component (for example, a hard disk drive or a memory module) in the base of the electronic apparatus, he or she needs only to push the operating element exposed outside the main body to drive the rod to push the cover in order to detach the cover from the main body and to electrically disconnect the battery module from the main body. Therefore, static electricity cannot be produced in the process of detaching or exchanging the component, and the process of detaching the cover from the main body is easier than in the previous art.

BRIEF DESCRIPTION OF THE DRAWINGS

FIG. 3A is a schematic diagram of a first side of a rod of the base structure of an electronic apparatus of the present invention.

FIG. 3B is a schematic diagram of a second side of the rod of the base structure of an electronic apparatus of the present invention.

FIG. 6A is a schematic diagram of the relative positions of the rod moving toward a second position and the cover of the base structure of an electronic apparatus of the present invention.

DETAILED DESCRIPTION OF THE PREFERRED EMBODIMENT

The advantages and innovative features of the invention will become more apparent from the following detailed description of the better embodiments when taken in conjunction with the accompanying drawings.

In an embodiment of the present invention, the electronic device is a portable computer such as a laptop or tablet computer, but it is not limited in the present invention. It can be also applied to other electronic devices with similar structures.

Figure 1:
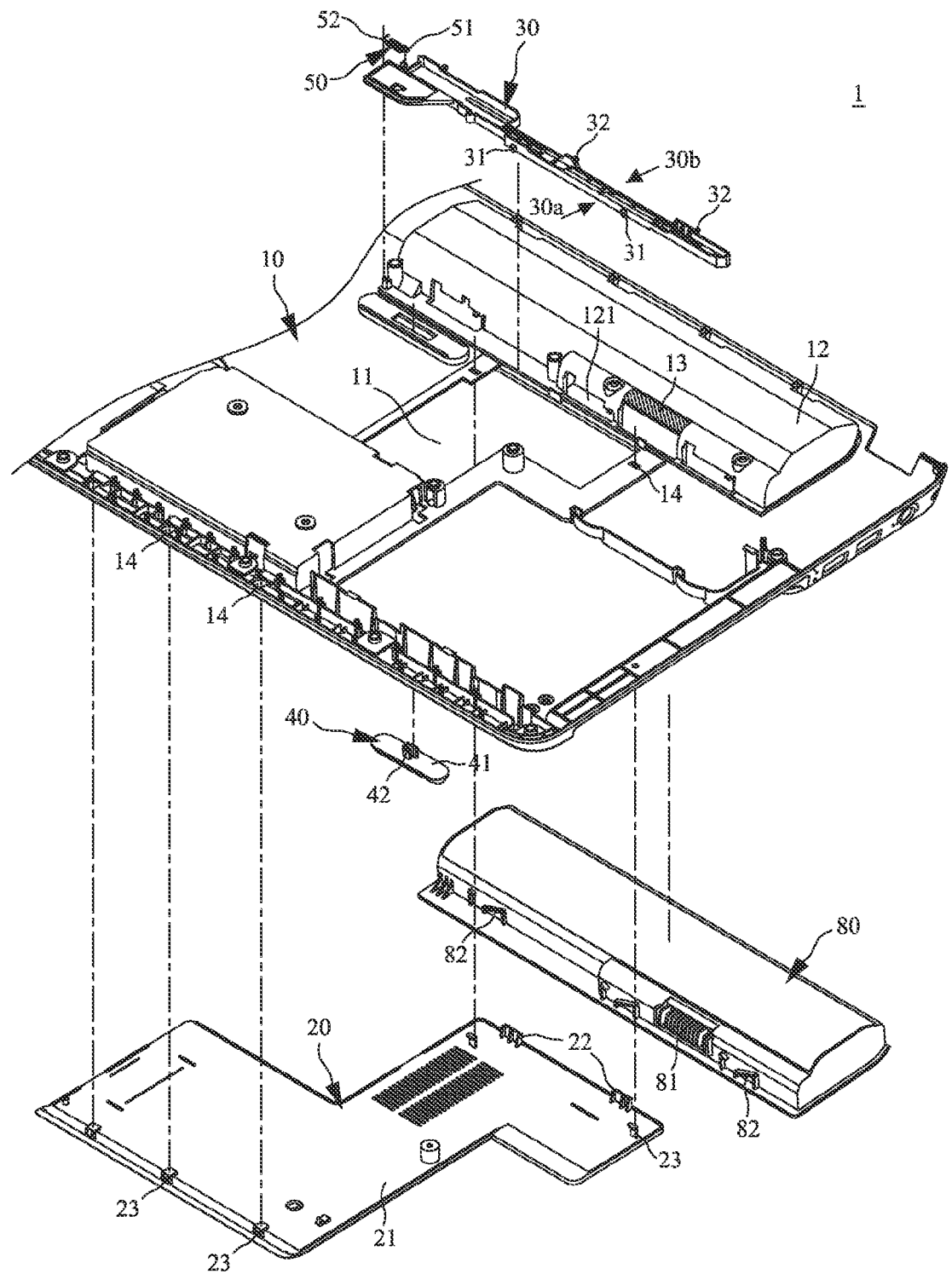
FIG. 1 is an exploded diagram of a base structure of an electronic apparatus of the present invention.

Please refer to FIG. 1, which is an exploded diagram of a base structure 1 of an electronic apparatus of the present invention. As shown in FIG. 1, a base structure 1 of an electronic apparatus comprises a main body 10, a cover 20, a rod 30, and an operating element 40. The main body 10 comprises a hollow portion 11, a containing portion 12, and an electrical connecting portion 13. The hollow portion 11 is a hollow structure located on a surface of the main body 10, and the hollow portion 11 corresponds to the disposal locations of replaceable components (such as hard disk drives or memory modules) in the main body 10 so as to facilitate disassembly or replacement of the components from the hollow portion 11 by the user. The containing portion 12 is a space recessed into the main body 10 for accommodating the battery module 80. The battery module 80 has an electrical connector 81. When the battery module 80 is placed in the containing portion 12, the electrical connector 81 is electrically connected to the electrical connecting portion 13 of the main body 10. The electrical connecting portion 13 is electrically connected with the components in the main body 10 such that the battery module 80 can supply the power to the device by the electrical connecting portion 13. One side of the containing portion 12 adjacent to the rod 30 comprises at least one hole 121.

The cover 20 is detachably combined with the main body 10. The cover 20 combines with the main body 10 to cover the hollow portion 11 to prevent the exposure of the components in the main body 10. The shape and size of the cover 20 can be changed according to different designs of the hollow portion 11. The cover 20 comprises a flat plate portion 21 and at least one actuating element 22. Each actuating element 22 is individually connected to the flat plate portion 21, and each actuating element 22 is located at a side of the flat plate portion 21 adjacent to the rod 30. In addition, the cover 20 further comprises at least one auxiliary fixing element 23 disposed at a peripheral portion of the cover 20 for use in combining the cover 10 with the main body 10. Each auxiliary fixing element 23 can be a hook structure, but the present invention is not limited to this. Relatively, at least one fixing portion 14 is disposed at a location of the main body 10 corresponding to the at least one auxiliary fixing element 23. Each fixing portion 14 can be a slot structure provided for the hook structure to pass through for fixing the cover in place.

The rod 30 is movably combined with the main body 10. Two sides of the rod 30 are respectively adjacent to the containing portion 12 and the hollow portion 11. The rod 30 comprises a first side 30a and a second side 30b relative to the first side 30a. The first side 30a corresponds to the hollow portion 11 of the main body 10, and the second side 30b corresponds to the containing portion 12 of the main body 10. The first side 30a comprises at least one first driving portion 31, and the second side 30b comprises at least one second driving portion 32. The disposal location and quantity of the first driving portion 31 can be changed according to the actuating element 22 of the cover 20. The disposal location and quantity of the second driving portion 32 can be changed according to the corresponding actuating structure 82 of the battery module 80.

Each first driving portion 31 protrudes from a surface of the first side 30a, and each second driving portion 32 protrudes from a surface of the second side 30b. Therefore, by the movement of the rod 30, the at least one first driving portion 31 and the at least one actuating element 22 of the cover 20 are worked together to control the combination of the cover 20 and the main body 10. The at least one second driving portion 32 passes through the at least one hole 121 of the containing portion 12. By the movement of the rod 30, the at least one second driving portion 32 and the battery module 80 placed in the containing portion 12 are worked together to the control battery module 80 to be electrically disconnected from the electrical connecting portion 13 of the main body 10.

The operating element 40 comprises an operation portion 41 and a connecting portion 42. The operation portion 41 is exposed on the outside of the main body 10 for manual operation by the user. One end of the connecting portion 42 is connected to the operation portion 41, and the other end of the connecting portion 42 is connected to the rod 30 through the main body 10. The operating element 40 moves relative to the main body 10 and is connected to the rod 30 such that the rod 30 can be moved to a first position or a second position by moving the operating element 40 relative to the main body 10.

In addition, the base structure 1 of the present invention further comprises an elastic element 50. The elastic element 50 comprises a first end 51 and a second end 52. The first end 51 is connected to the rod 30 and the second end 52 is connected to the main body 10. The elastic element 50 can provide an elastic restoring force for moving the rod 30 back to the first position.

Figure 2:
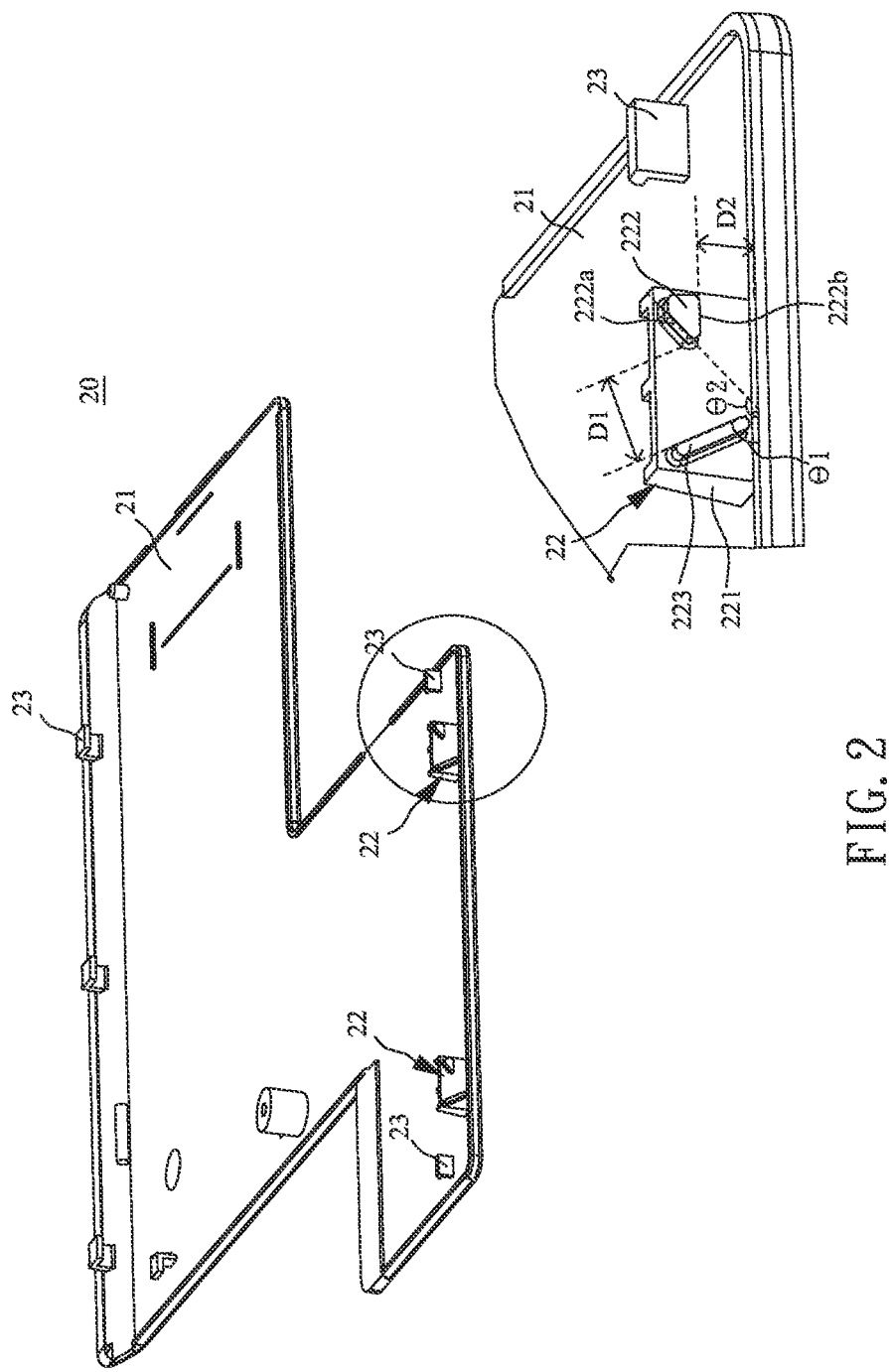
FIG. 2 is a schematic diagram of a cover of the base structure of an electronic apparatus of the present invention.

Please refer to FIG. 2, which is a schematic diagram of the cover of the base structure of an electronic apparatus of the present invention. As shown in FIG. 1 and FIG. 2, each actuating element 22 of the cover 20 comprises a supporting portion 221, a convex post structure 222, and a rib structure 223. One end of the supporting portion 221 is connected to the flat plate portion 21, and the supporting portion 221 is substantially perpendicular to the flat plate portion 21. The convex post structure 222 and the rib structure 223 both protrude from the support portion 221, and the extending directions of the convex post structure 222 and the rib structure 223 are substantially parallel to the flat plate portion 21.

The convex post structure 222 comprises an inclined surface 222a and an abutting portion 222b, and there is an angle between the inclined surface 222a and the flat plate portion 21. The abutting portion 222b is a plane structure of the convex post structure 222 that is the closest to the flat plate portion 21 and substantially parallel to the flat plate portion 21. In the structural design of the actuating element 22 in this embodiment, the convex post structure 222 is a trapezoid bump; however, the structural form of the convex post structure is not limited to this. The rib structure 223 is a rib with another angle relative to the flat plate portion 21. In the design, there is a first inclined angle $\Theta 1$ between the rib structure 223 and the flat plate portion 21, and the first inclined angle $\Theta 1$ is less than 90 degrees. There is a second inclined angle $\Theta 2$ between the inclined surface 222a of the convex post structure 222 and the flat plate portion 21, and the second inclined angle $\Theta 2$ is greater than 90 degrees and less than 180 degrees. The first inclined angle $\Theta 1$ and the second inclined angle $\Theta 2$ are as shown in FIG. 2. Accordingly, the actuating element 22 can be moved along different directions by the first driving portion 31. It means that the first driving portion 31 can interact with the rib structure 223 or the convex post structure 222 to produce different results.

In addition, for the convenience of the interaction between the actuating element 22 of the cover 20 and the first driving portion 31 of the rod 30, in this embodiment, a first distance D1 between the convex post structure 222 of the actuating element 22 and the rib structure 223 at least allows the first driving portion 31 of the rod 30 to pass; therefore, the first driving portion 31 can move obliquely between the convex post structure 222 and the rib structure 223 in the present embodiment. A second distance D2 between the abutting portion 222b of the convex post structure 222 and the flat plate portion 221 allows at least the first driving portion 31 to pass; therefore, the first driving portion 31 moves substantially horizontally between the abutting portion 222b of the convex post structure 222 and the flat plate portion 221. However, the first distance D1 or the second distance D2 is not limited to this.

Please refer to FIG. 3A and FIG. 3B. FIG. 3A is a schematic diagram of the first side of the rod of the base structure of an electronic apparatus of the present invention. FIG. 3B is a schematic diagram of the second side of the rod of the base structure of an electronic apparatus of the present invention.

As shown in FIG. 3A, the first side 30a of the rod 30 is provided with the at least one first driving portion 31, and each first driving portion 31 comprises a corresponding inclined surface 31a and the corresponding abutting portion 31b. The corresponding inclined surface 31a of the first driving portion 31 is used for interacting with the inclined surface 222a of the convex post structure 222 of the cover 20 in FIG. 2. The corresponding abutting portion 31b of the first driving portion 31 is used for interacting with the abutting portion 222b of the convex post structure 222 of the cover 20 in FIG. 2. In this embodiment, the first driving portion 31 is a trapezoid bump, but the structure is not limited to this.

As shown in FIG. 3B, the second side 30b of the rod 30 is provided with the at least one second driving portion 32. Each second driving portion 32 comprises a pushing end 32a. The pushing end 32a is used for interacting with the corresponding actuating structure of the battery module. In this embodiment, the second driving portion 32 is a T-shaped bump, but the structure is not limited to this.

Figure 4A:
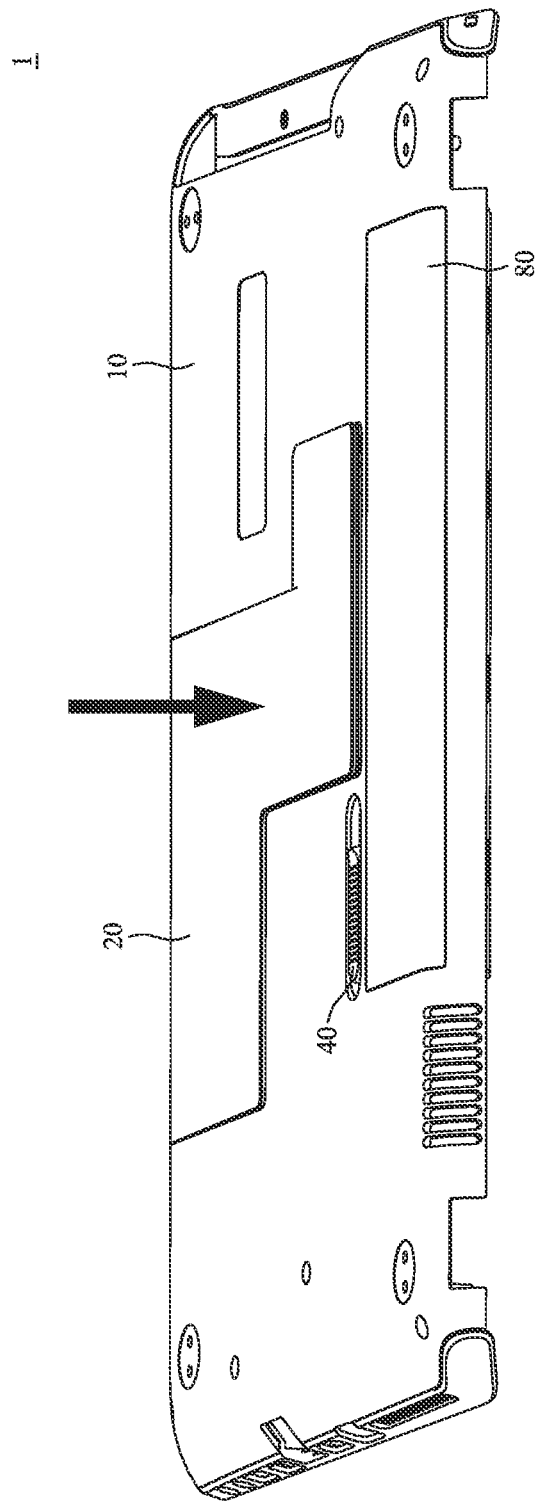
FIG. 4A is a schematic diagram of the process of combining the cover with the main body of the base structure of an electronic apparatus of the present invention.
Figure 4B:
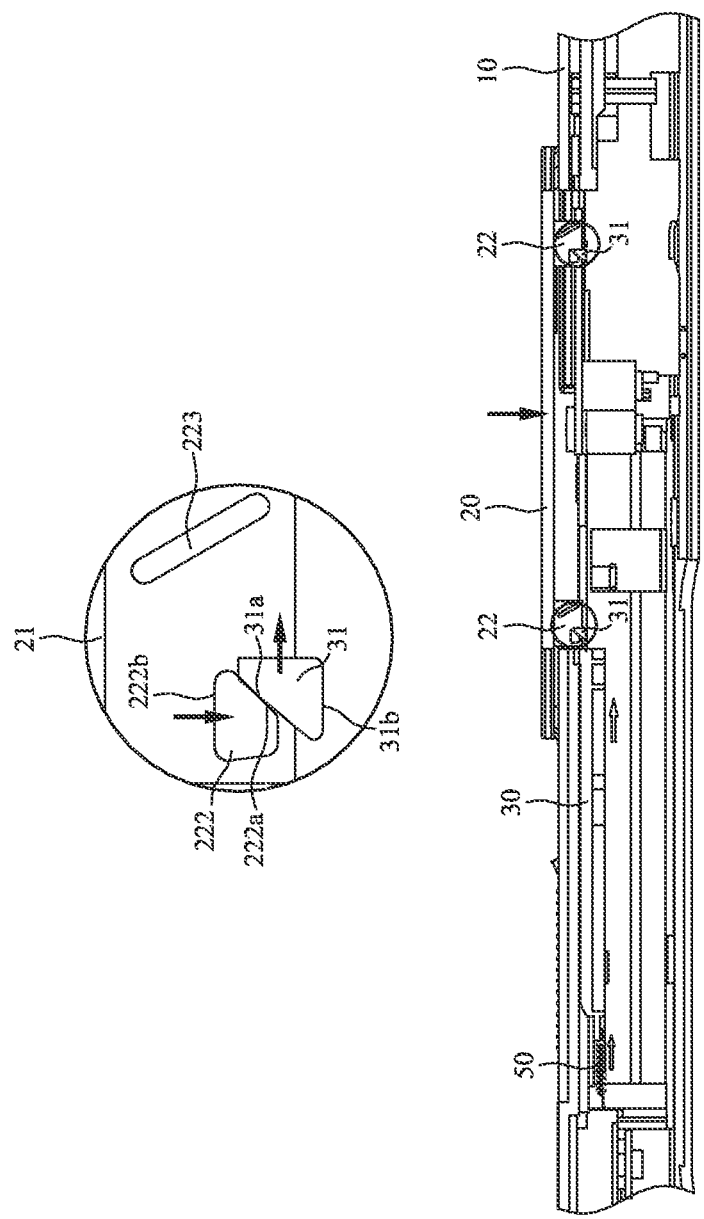
FIG. 4B is a sectional view diagram of the process of combining the cover with the main body of the base structure of an electronic apparatus of the present invention.
Figure 4C:
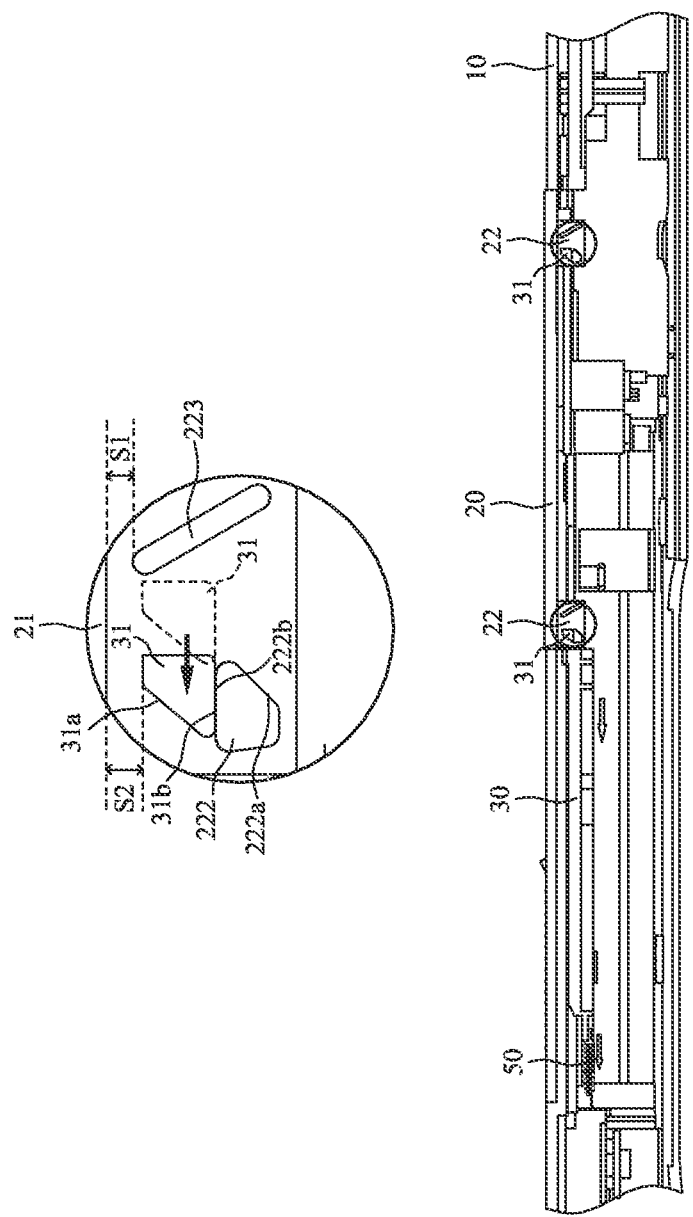
FIG. 4C is a sectional view diagram of the cover combined with the main body of the base structure of an electronic apparatus of the present invention.

Please refer to FIG. 4A to 4C. FIG. 4A is a schematic diagram of the process of combining the cover with the main body of the base structure of an electronic apparatus of the present invention. FIG. 4B is a sectional view diagram of the process of combining the cover with the main body of the base structure of an electronic apparatus of the present invention. FIG. 4C is a sectional view diagram of the cover combined with the main body of the base structure of an electronic apparatus of the present invention. It should be noted that, to clearly show the interaction between the cover 20 and the main body 10, only partial cross-section structures of the rod 30 are shown in the sectional view diagrams.

As shown in FIG. 4A and 4B, when the user wants to combine the cover 20 with the main body 10, he or she applies an external force to the cover 20 along the direction of the arrow in the diagram such that the cover 20 is moved to the main body 10. At this moment, the rod 30 is located in the first position P1, and each first driving portion 31 of the rod 30 is substantially perpendicular to the convex post structure 222 of each actuating element 22 of the cover 20. When the cover 20 is moved continuously towards the main body 10, the inclined surface 222a of each convex post structure 222 contacts the corresponding inclined surface 31a of each first driving portion 31. By the interaction of two inclined surfaces, the rod 30 is driven by each first driving portion 31 to move along a substantially horizontal direction, and the elastic element 50 is stretched by the rod 30. Due to the design of the first distance D1 between the convex post structure 222 and the rib structure 223, each first driving portion 31 gradually passes through the convex post structure 222 and rib structure 223 under the movement of the cover 20. Then the corresponding inclined surface 31a of each first driving portion 31 leaves the state of contacting the inclined surface 222a of the convex post structure 222.

As shown in FIG. 4C, when the cover 20 is moved toward the main body 10 and then comes to rest against the main body 10, the inclined surface 31a of each first driving portion 31 has left the state of contact with the inclined surface 222a of the convex post structure 222. It is as shown in the location of the first driving portion 31 in dashed lines in FIG. 4C. At this time, because each first driving portion 31 of the rod 30 is unblocked, the rod 30 can be moved back to the first position by the elastic force of the elastic element 50, and each first driving portion 31 is driven to move to the location of the first driving portion 31 indicated by solid lines in FIG. 4C. At this time, each first driving portion 31 is located above each convex post structure 222. By the corresponding abutting portion 31b of each first driving portion 31 and the abutting portion 222b of the convex post structure 222 blocking each other to form a locking state, the cover 20 can be fixed on the main body 10. In the combination of the cover 20 and the main body 10, a first closest distance S1 between the rib structure 223 and the flat plate portion 21 is not greater than a second closest distance S2 between the first driving portion 31 of the rod 30 and the flat plate portion 21 such that the first driving portion 31 can be successfully activated with the rib structure 223.

Figure 5A:
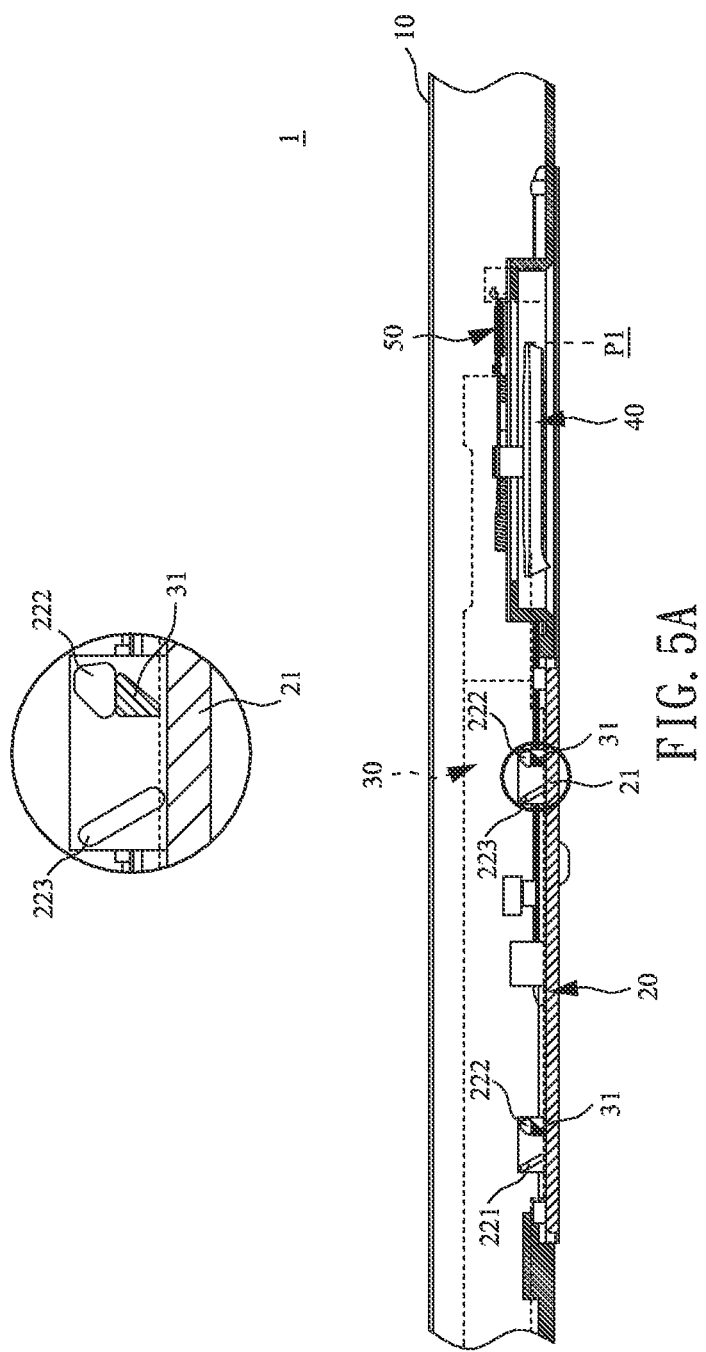
FIG. 5A is a schematic diagram of the relative positions of the rod in a first position and the cover of the base structure of an electronic apparatus of the present invention.
Figure 5B:
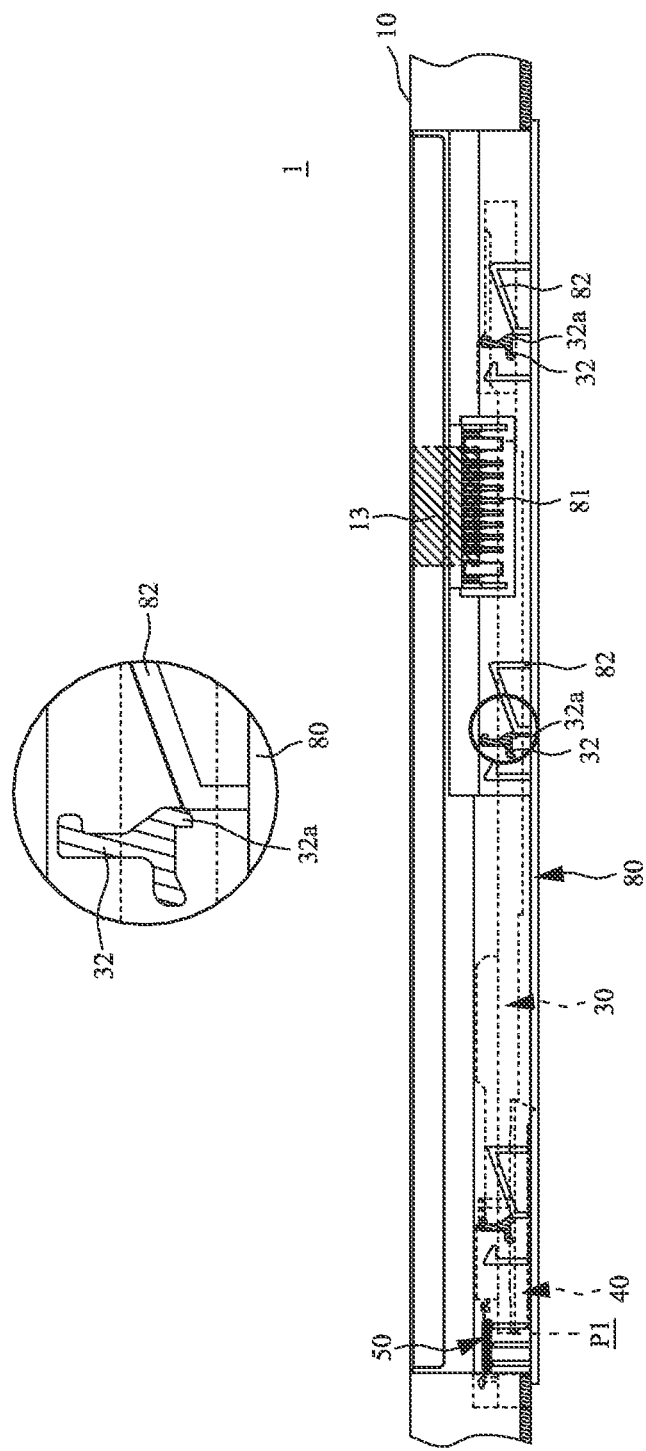
FIG. 5B is a schematic diagram of the relative positions of the rod in the first position and the battery module of the base structure of an electronic apparatus of the present invention.

Please refer to FIG. 5A and 5B. FIG. 5A is a schematic diagram of the relative positions of the rod in a first position and the cover of the base structure of an electronic apparatus of the present invention. FIG. 5B is a schematic diagram of the relative positions of the rod in the first position and the battery module of the base structure of an electronic apparatus of the present invention. It should be noted that to clearly show the interactions between the rod 30 and the cover 20 or the battery module 80, in the figures, most of the structure of the rod 30 is indicated by dashed lines so as to show the cross-section of each first driving portion 31 and each second driving portion 32 of the rod 30.

As shown in FIG. 5A, the cover 20 is combined with the main body 10, and the operating element 40 and the rod 30 remain in the first position P1 without external force. At this time, the convex post structure 222 is still blocked by each first driving portion 31 (that is, the convex post structure 222 is blocked along the substantially perpendicular direction in the figure). As shown in FIG. 5B, when the operating element 40 and the rod 30 remain in the first position P1, the whole battery module 80 is placed in the main body 10, and the electrical connector 81 of the battery module 80 is electrically connected with the electrical connecting portion 13 (shown in dashed lines) of the main body 10. In this case, each second driving portion 31 does not actuate mutually with the corresponding actuating structure 82 of the battery modules 80.

Figure 6B:
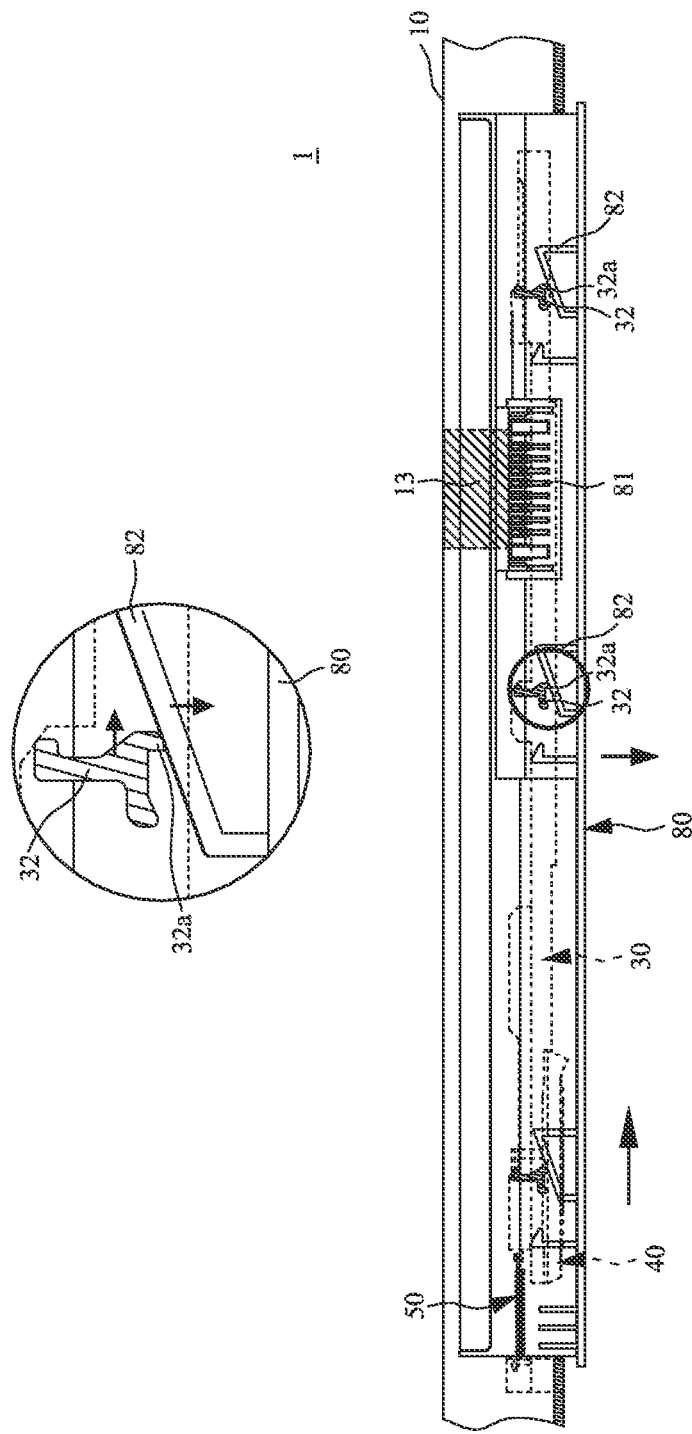
FIG. 6B is a schematic diagram of the relative positions of the rod moving toward the second position and the battery module of the base structure of an electronic apparatus of the present invention.

Please refer to FIG. 6A and 6B. FIG. 6A is a schematic diagram of the relative positions of the rod moving toward the second position and the cover of the base structure of an electronic apparatus of the present invention. FIG. 6B is a schematic diagram of the relative positions of the rod moving toward the second position and the battery module of the base structure of an electronic apparatus of the present invention. Similarly, to clearly show the interactions between the rod 30 and the cover 20 or the battery module 80, in the figures, most of the structure of the rod 30 is indicated by dashed lines so as to show the cross-section of each first driving portion 31 and each second driving portion 32 of the rod 30.

As shown in FIG. 6A, when the user wants to detach the cover 20 from the main body 10, he or she applies an external force on the operating element 40 along the horizontal direction indicated by the arrow; then the rod 30 is driven to move away from the first position P1 toward the second position P2. As the rod 30 moves, each first driving portion 31 substantially horizontally moves in the direction of the arrow and stretches the elastic element 50 into a stretched state. With the movement of each first driving portion 31, the locking state between each convex post structure 222 and each first driving portion 31 in FIG. 5A is gradually released, and each first driving portion 31 moves towards each rib structure 223 until each first driving portion 31 contacts the inclined surface formed on each rib structure 223. As shown in FIG. 6B, with the movement of the rod 30, each second driving portion 32 begins to push the corresponding actuating structure 82 of the battery modules 80 such that the battery module 80 moves in the direction substantially perpendicular to the rod 30. It means that each second driving portion 32 is driven to push the battery module 80 outward from the main body 10.

When the rod 30 moves substantially horizontally toward each rib structure 223 from the location in FIG. 6A, each first driving portion 31 begins to push the inclined plane formed on each rib structure 223 and to move along the inclined plane. By the interactions of the inclined planes, each rib structure 223 moves in the direction substantially perpendicular to the moving direction of the rod 30 such that the flat plate portion 21 of the cover 20 is driven to gradually leave the original position of the cover 20 combined with the main body 10. At the same time, each second driving portion 31 also continuously pushes the corresponding actuating structure 82 of the battery module 80 such that the battery module 80 continuously shifts in the direction substantially perpendicular to the moving direction of the moving rod 30.

Figure 7A:
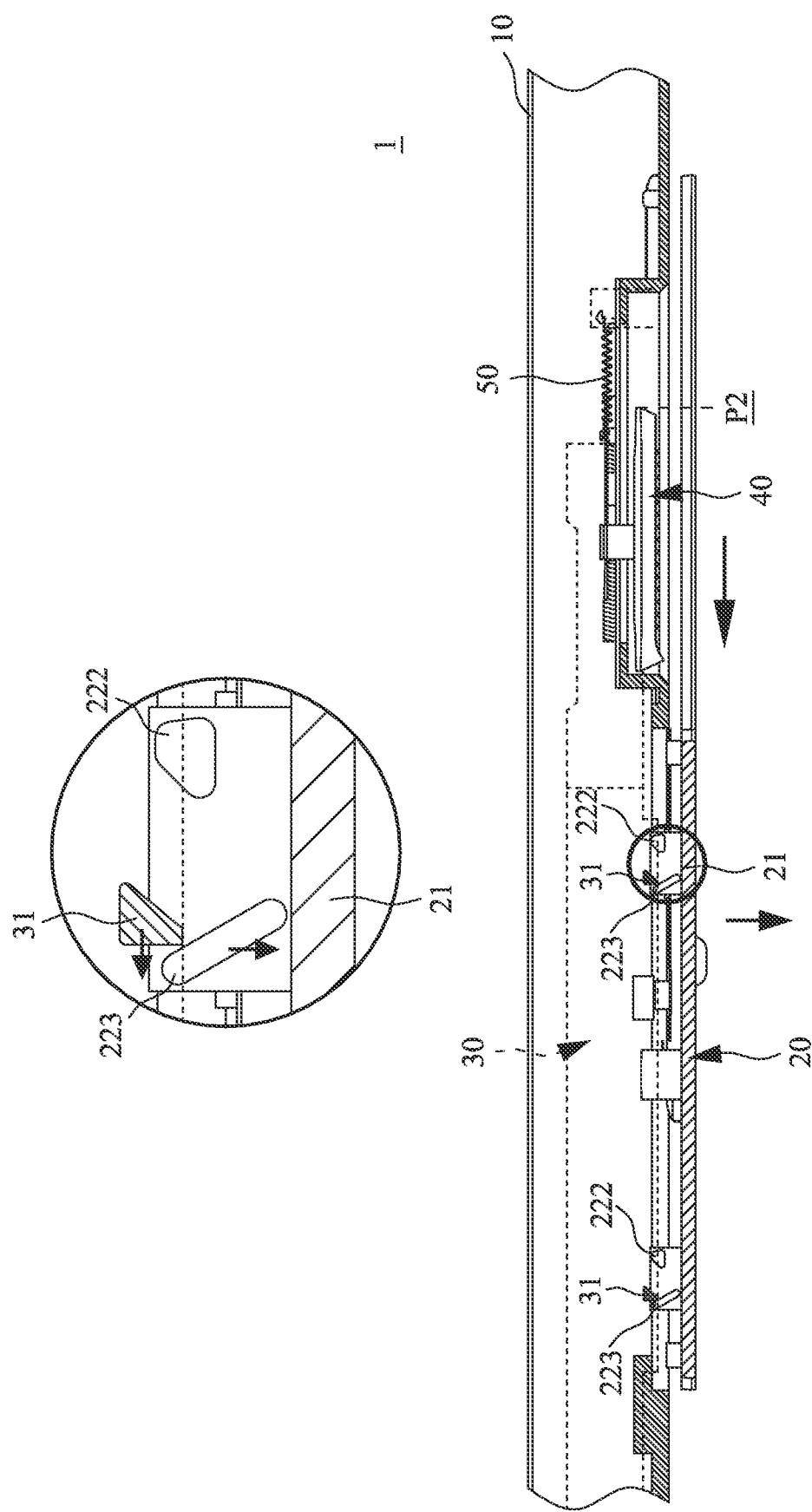
FIG. 7A is a schematic diagram of the relative positions of the rod in the second position and the cover of the base structure of an electronic apparatus of the present invention.
Figure 7B:
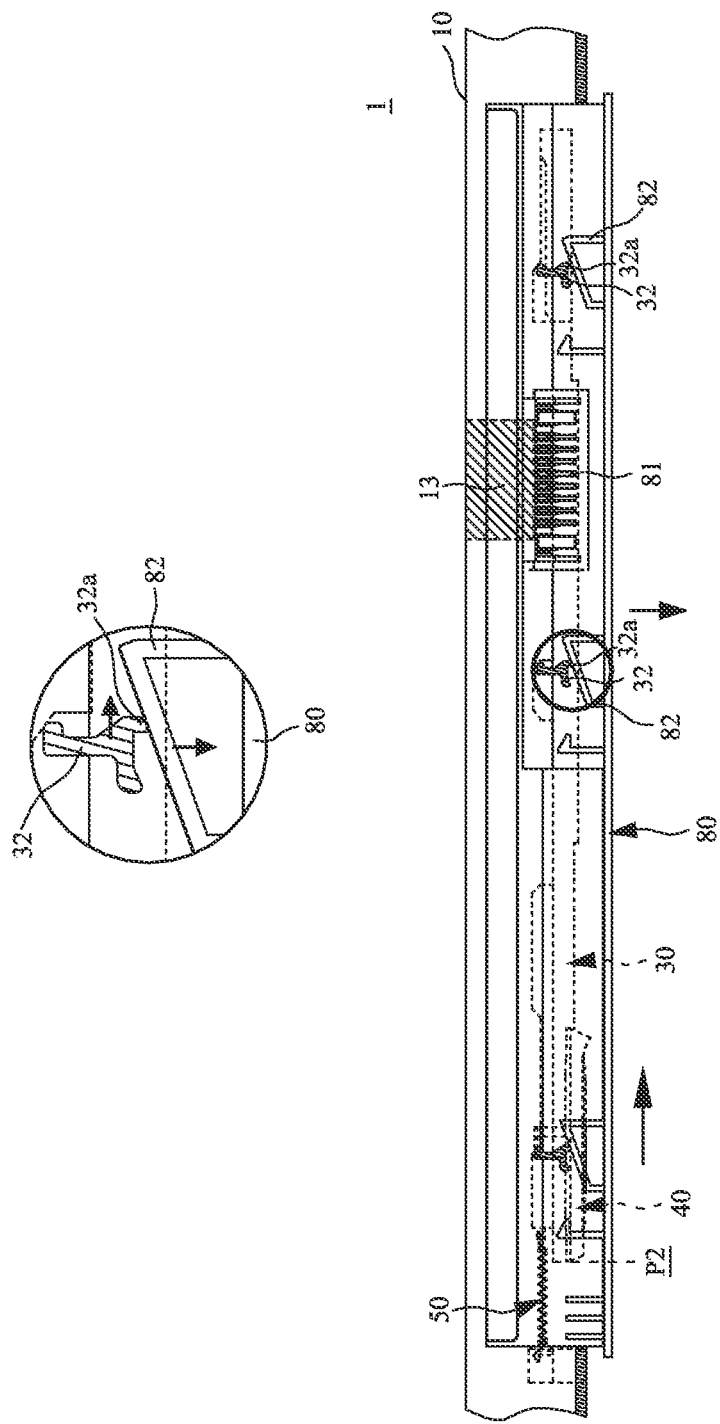
FIG. 7B is a schematic diagram of the relative positions of the rod in the second position and the battery module of the base structure of an electronic apparatus of the present invention.

Please refer to FIG. 7A and 7B. FIG. 7A is a schematic diagram of the relative positions of the rod in the second position and the cover of the base structure of an electronic apparatus of the present invention. FIG. 7B is a schematic diagram of the relative positions of the rod in the second position and the battery module of the base structure of an electronic apparatus of the present invention. Similarly, to clearly show the interactions between the rod 30 and the cover 20 or the battery module 80, in the figures, most of the structure of the rod 30 is indicated by dashed lines so as to show the cross-section of each first driving portion 31 and each second driving portion 32 of the rod 30.

As shown in FIG. 7A, when the operating element 40 has driven the rod 30 to the second position P2, each first driving portion 31 has pushed each rib structure 223 to the end of each rib structure 223 such that a distance between the flat plate portion 21 of the cover 20 and the main body 10 is formed. At this time, the user can pull manually the flat plate portion 21 of the cover 20 to detach the cover 20 from the main body 10. As shown in FIG. 7B, at the same time, each second driving portion 31 has pushed the battery module 80 outwards from the main body 10 such that the electrical connector 81 of the battery module 80 is electrically disconnected from the electrical connecting portion 13 of the main body 10. Therefore, other components in the main body 10 can be protected from electrostatic damage caused by the user touching the components.

After the cover 20 is detached from the main body 10, each first driving portion 31 of the rod 30 is no longer blocked, so the rod 30 can be moved from the second position P2 back to the first position P1 as shown in FIG. 4B by the elastic force of the elastic element 50 so as to respond to the corresponding operation of the cover 20 in combination with the main body 10.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A base structure of an electronic apparatus, comprising:
a main body, comprising a hollow portion, a containing portion, and an electrical connecting portion, the containing portion being used for placing a battery module and the electrical connecting portion being used for electrically connecting to the battery module;
a cover detachably combining with the main body to cover the hollow portion, the cover comprising at least one actuating element;
a rod movably combining with the main body and two sides of the rod being respectively adjacent to the containing portion and the hollow portion; the rod comprising at least one first driving portion and at least one second driving portion, the at least one first driving portion corresponding to the hollow portion and the at least one second driving portion corresponding to the containing portion; and
an operating element passing through the main body and connecting to the rod, the operating element driving the rod relative to the main body to a first position or a second position;
wherein the cover is combined with the main body, the rod in the first position fixes the cover by the at least one first driving portion and the at least one actuating element of the cover forming a lock state; when the rod moves from the first position to the second position, the at least one first driving portion unlocks the lock state with the at least one actuating element and pushes the at least one actuating element to move the cover outward from the main body; and when the rod moves from the first position to the second position, the at least one second driving portion pushes the battery module so that the battery module is electrically disconnected from the electrical connecting portion.

2. The base structure of an electronic apparatus as claimed in claim 1, wherein each actuating element comprises a supporting portion, a convex post structure, and a rib structure; the convex post structure and the rib structure both protrude from the support portion, and a first distance between the convex post structure and the rib structure allows the first driving portion to pass.

3. The base structure of an electronic apparatus as claimed in claim 2, wherein the cover further comprises a flat plate portion and a second distance between the convex post structure and the flat plate portion allows the first driving portion to pass.

4. The base structure of an electronic apparatus as claimed in claim 3, wherein in the combination of the cover and the main body, a first closest distance between each rib structure and the flat plate portion is not greater than a second closest distance between each first driving portion of the rod and the flat plate portion.

5. The base structure of an electronic apparatus as claimed in claim 3, wherein each convex post structure comprises an inclined surface and an abutting portion, and each first driving portion comprises a corresponding inclined surface and a corresponding abutting portion; in a process of combining the cover with the main body, the rod is moved away from the first position by the inclined surface of the convex post structure pushing the corresponding inclined surface of the first driving portion; after the cover is combined with the main body, the rod moves back to the first position so that the corresponding abutting portion of each first driving portion abuts the abutting portion of each convex post structure.

6. The base structure of an electronic apparatus as claimed in claim 5, wherein there is a first inclined angle between the rib structure and the flat plate portion, and there is a second inclined angle between the inclined surface of the convex post structure and the flat plate portion; the first inclined angle is less than 90 degrees, and the second inclined angle is greater than 90 degrees and less than 180 degrees.

7. The base structure of an electronic apparatus as claimed in claim 1, wherein the containing portion comprises at least one hole, and the at least one second driving portion of the rod passes through the at least one hole to push the battery module.

8. The base structure of an electronic apparatus as claimed in claim 1, wherein the cover further comprises at least one auxiliary fixing element for helping the cover to combine with the main body.

9. The base structure of an electronic apparatus as claimed in claim 1, wherein each second driving portion comprises a pushing end, and in a process of moving the rod from the first position to the second position, the rod pushes the battery module outward from the main body by the pushing end of each second driving portion.

10. The base structure of an electronic apparatus as claimed in claim 1, further comprising an elastic element, and the elastic element comprises a first end and a second end; the first end is connected to the rod and the second end is connected to the main body; the rod is moved back to the first position by an elastic restoring force formed by the elastic element.

11. An electronic apparatus, comprising a base structure, the base structure comprising:
a main body comprising a hollow portion, a containing portion, and an electrical connecting portion, the containing portion being used for placing a battery module and the electrical connecting portion being used for electrically connecting to the battery module;
a cover detachably combining with the main body to cover the hollow portion, the cover comprising at least one actuating element;
a rod movably combining with the main body and two sides of the rod being respectively adjacent to the containing portion and the hollow portion; the rod comprising at least one first driving portion and at least one second driving portion, the at least one first driving portion corresponding to the hollow portion and the at least one second driving portion corresponding to the containing portion; and
an operating element passing through the main body and connecting to the rod, the operating element driving the rod to a first position or a second position relative to the main body;
wherein after the cover is combined with the main body, the rod in the first position fixes the cover by the at least one first driving portion and the at least one actuating element of the cover forming a lock state; when the rod moves from the first position to the second position, the at least one first driving portion unlocks the lock state with the at least one actuating element and pushes the at least one actuating element to move the cover outward from the main body; at the same time, the at least one second driving portion pushes the battery module so that the battery module is electrically disconnected from the electrical connecting portion.

12. The electronic apparatus as claimed in claim 11, wherein each actuating element comprises a supporting portion, a convex post structure, and a rib structure; the convex post structure and the rib structure both protrude from the support portion, and a first distance between the convex post structure and the rib structure allows the first driving portion to pass.

13. The electronic apparatus as claimed in claim 12, wherein the cover further comprises a flat plate portion and a second distance between the convex post structure and the flat plate portion allows the first driving portion to pass.

14. The electronic apparatus as claimed in claim 13, wherein in the combination of the cover and the main body, a first closest distance between each rib structure and the flat plate portion is not greater than a second closest distance between each first driving portion of the rod and the flat plate portion.

15. The electronic apparatus as claimed in claim 13, wherein each convex post structure comprises an inclined surface and an abutting portion, and each first driving portion comprises a corresponding inclined surface and a corresponding abutting portion; in a process of combining the cover with the main body, the rod is moved away from the first position by the inclined surface of the convex post structure pushing the corresponding inclined surface of the first driving portion; after the cover is combined with the main body, the rod moves back to the first position so that the corresponding abutting portion of each first driving portion abuts the abutting portion of each convex post structure.

16. The electronic apparatus as claimed in claim 15, wherein there is a first inclined angle between the rib structure and the flat plate portion, and there is a second inclined angle between the inclined surface of the convex post structure and the flat plate portion; the first inclined angle is less than 90 degrees, and the second inclined angle is greater than 90 degrees and less than 180 degrees.

17. The electronic apparatus as claimed in claim 11, wherein the containing portion comprises at least one hole, and the at least one second driving portion of the rod passes through the at least one hole to push the battery module.

18. The electronic apparatus as claimed in claim 11, wherein the cover further comprises at least one auxiliary fixing element for helping the cover to combine with the main body.

19. The electronic apparatus as claimed in claim 11, wherein each second driving portion comprises a pushing end, and in a process of moving the rod away from the first position to the second position, the rod pushes the battery module outward from the main body by the pushing end of each second driving portion.

20. The electronic apparatus as claimed in claim 11, wherein the base structure further comprises an elastic element, and the elastic element comprises a first end and a second end; the first end is connected to the rod and the second end is connected to the main body; the rod is moved back to the first position by an elastic restoring force formed by the elastic element.

* * * * *